US010353625B2

United States Patent
Byun

(10) Patent No.: US 10,353,625 B2
(45) Date of Patent: Jul. 16, 2019

(54) MEMORY SYSTEM AND OPERATING METHOD OF MEMORY SYSTEM

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 68 days.

(21) Appl. No.: 15/096,903

(22) Filed: Apr. 12, 2016

(65) Prior Publication Data

US 2017/0139643 A1 May 18, 2017

(30) Foreign Application Priority Data

Nov. 17, 2015 (KR) .......................... 10-2015-0161074

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0604; G06F 3/0656; G06F 3/0673; G06F 3/0679
See application file for complete search history.

(56) References Cited

U.S. PATENT DOCUMENTS

| | | | |
|---|---|---|---|
| 9,043,530 B1* | 5/2015 | Sundaram | G06F 3/068 711/100 |
| 2007/0005894 A1* | 1/2007 | Dodge | G06F 12/0866 711/118 |
| 2010/0082917 A1* | 4/2010 | Yang | G06F 12/0246 711/157 |
| 2016/0116972 A1* | 4/2016 | Shin | G06F 3/0634 711/162 |

FOREIGN PATENT DOCUMENTS

| | | |
|---|---|---|
| KR | 101106977 | 1/2012 |
| KR | 1020130055744 | 5/2013 |
| KR | 1020130060795 | 6/2013 |

* cited by examiner

*Primary Examiner* — Tuan V Thai
*Assistant Examiner* — Alexander J Yoon
(74) *Attorney, Agent, or Firm* — IP & T Group LLP

(57) ABSTRACT

The memory system may include a memory device including: a plurality of planes each including a plurality of memory blocks suitable for storing data, and a plurality of page buffers corresponding to the planes; and a controller including a memory, the controller being suitable for performing a read operation to the memory blocks of a first plane storing a first data corresponding to a read command among the planes by referring to a meta-data of the first data, and for providing the first data to a host; wherein the meta-data is stored in the memory or the page buffers.

12 Claims, 12 Drawing Sheets

MEMORY SYSTEM AND OPERATING METHOD OF MEMORY SYSTEM

CROSS-REFERENCE TO RELATED APPLICATION(S)

The present application claims priority of Korean Patent Application No. 10-2015-0161074, filed on Nov. 17, 2015 in the Korean Intellectual Property Office, the disclosure of which is incorporated herein by reference in its entirety.

BACKGROUND

1. Field

Exemplary embodiments of the present invention relate generally to a memory system, and more particularly, to a memory system for processing data on a memory device and an operating method of the memory system.

2. Description of the Related Art

The computer environment paradigm has shifted to ubiquitous computing systems that can be used anywhere and at any time. Due to this, use of portable electronic devices, such as mobile phones, digital cameras, and notebook computers has rapidly increased. These portable electronic devices generally use a memory system for storing data, that is, a data storage device. The memory system may include one or more semiconductor memory devices also referred to simply as memory devices. The memory system may be used as a main or an auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, for processing data more rapidly and or more stably by minimizing the complexity of the one or more memory devices included in the memory system. The memory system and the operating method may reduce the operational load to each of the one or more memory devices included therein and may maximize their use efficiency. Other embodiments and or variations thereof of the present disclosure will become apparent to those skilled in this art from the following description.

In an embodiment, a memory system may include a memory device including: a plurality of planes each including a plurality of memory blocks suitable for storing data, and a plurality of page buffers corresponding to the planes; and a controller including a memory, the controller being suitable for performing a read operation to the memory blocks of a first plane storing a first data corresponding to a read command among the planes by referring to a meta-data of the first data, and for providing the first data to a host; wherein the meta-data is stored in the memory or the page buffers.

The controller may read the first data from the memory blocks of the first plane, and may provide the first data to a host through a first page buffer corresponding to the first plane among the page buffers.

The first page buffer may include: a first sub-buffer suitable for storing the first data read from the memory blocks of the first plane; a second sub-buffer suitable for providing the host with the first data stored in the first sub-buffer; a third sub-buffer suitable for storing the meta-data of the first data stored in the first sub-buffer; and a fourth sub-buffer suitable for storing a copy of the first data stored in the first sub-buffer.

When the meta-data is not found in the memory, the controller may search the meta-data in the third sub-buffer, and may load the meta-data stored in the third sub-buffer onto the memory.

When the meta-data is not found in both of the memory and the first page buffer, the controller may store the meta-data stored in the memory blocks of the first plane in the first sub-buffer, and may load the meta-data stored in the first sub-buffer onto the memory.

When the controller fails to provide the host with the first data or another read command for the first data is provided, the controller may provide the host with the copy of the first data stored in the fourth sub-buffer.

When the controller fails to provide the host with the first data or another read command for the first data is provided, the controller may loads the meta-data stored in the third sub-buffer onto the memory, identifies the loaded meta-data, and may perform the read operation again.

The meta-data may include map segments of map data of the first data, and the controller may search the meta-data in one of the memory and the page buffers based on a map list of the map segments stored in one of the memory and the page buffers.

The controller may provide the first plane with a first boost command corresponding to the first plane among boost commands stored in the memory, and may perform the read operation.

The controller: may loads the meta-data stored in a first page buffer corresponding to the first plane among the page buffers onto the memory according to the first boost command; and may provide the host with the first data stored in the memory blocks of the first plane through the first page buffer, and stores the first data and the meta-data in the first page buffer during the read operation.

In an embodiment, an operating method of a memory system including a memory device and a controller, may include: receiving a read command for a first data stored in a first plane among a plurality of planes each including a plurality of memory blocks in the memory device; performing a read operation to the memory blocks of the first plane storing the first data by referring to a meta-data of the first data; and providing the first data to a host, wherein the meta-data may be stored in a memory of the controller or a plurality of page buffers of the memory device respectively corresponding to the planes.

The performing of the read operation may include: reading the first data from the memory blocks of the first plane; and providing the first data to the host through a first page buffer corresponding to the first plane among the page buffers.

The first page buffer comprises: a first sub-buffer suitable for storing the first data read from the memory blocks of the first plane; a second sub-buffer suitable for providing the host with the first data stored in the first sub-buffer; a third sub-buffer suitable for storing the meta-data of the first data stored in the first sub-buffer; and a fourth sub-buffer suitable for storing a copy of the first data stored in the first sub-buffer.

When the meta-data is not found in the memory, the performing of the read operation may include: searching the meta-data in the third sub-buffer; and loading the meta-data stored in the third sub-buffer onto the memory.

When the meta-data is not found in both of the memory and the first page buffer, the performing of the read operation may include: storing the meta-data stored in the memory blocks of the first plane in the first sub-buffer; and loading the meta-data stored in the first sub-buffer onto the memory.

When the providing of the first data falls or another read command for the first data is provided, the operating method of a memory system may further include providing the host with the copy of the first data stored in the fourth sub-buffer.

When the providing of the first data fails or another read command for the first data is provided, the operating method of a memory system may further include: loading the meta-data stored in the third sub-buffer onto the memory; Identifying the loaded meta-data; and performing the read operation again to the memory blocks of the first plane storing the first data by referring to the meta-data of the first data; and providing the first data to the host.

1 The meta-data may include map segments of map data of the first data; and the referring to the meta-data of the first data may include searches the meta-data in one of the memory and the page buffers based on a map list of the map segments stored in one of the memory and the page buffers.

The performing of the read operation may include: providing the first plane with a first boost command corresponding to the first plane among boost commands stored in the memory; and performing the read operation to the memory blocks of the first plane.

The performing of the read operation may further include: loading the meta-data stored in a first page buffer corresponding to the first plane among the page buffers onto the memory according to the first boost command; and storing the first data and the meta-data in the first page buffer, and wherein the providing of the first data is performed with the first data stored in the memory blocks of the first plane through the first page buffer.

DETAILED DESCRIPTION

Figure 1:
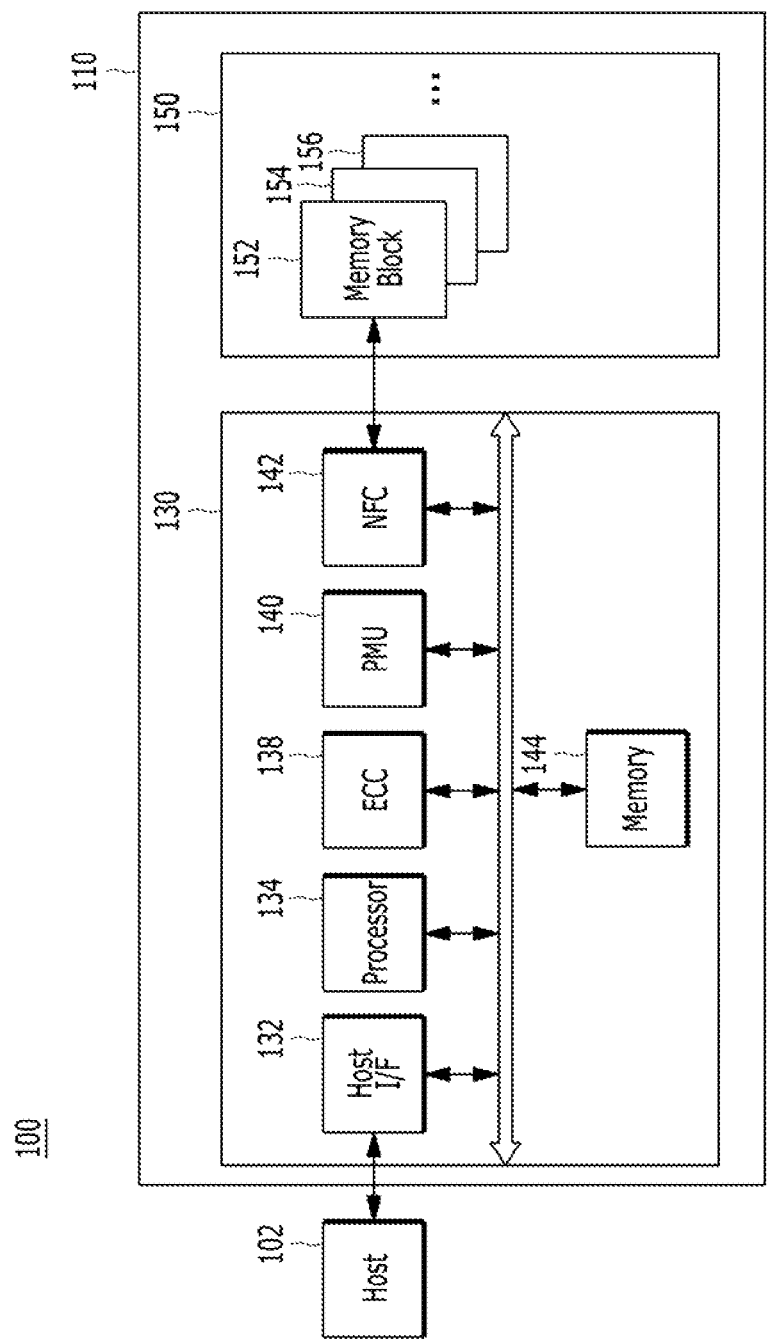
FIG. 1 is a diagram illustrating a data processing system including a memory system, according to an embodiment according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the invention to those skilled in the relevant art. Throughout the disclosure, like reference numerals refer to like parts throughout the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically stated otherwise. It should be readily understood that the meaning of "on" and "over" in the present disclosure should be interpreted in the broadest manner such that "on" means not only "directly on" but also "on" something with an intermediate feature(s) or a layer(s) therebetween, and that "over" means not only directly on top but also on top of something with an intermediate feature(s) or a layer(s) therebetween. When a first layer is referred to as being "on" a second layer or "on" a substrate, it may not only refer to a case where the first layer is formed directly on the second layer or the substrate but may also refer to a case where a third layer exists between the first layer and the second layer or the substrate.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be further understood that the terms "comprises", "comprising", "includes", "Including," "has," or "having" when used in this specification, specify the presence of the stated features, integers, operations, elements, and/or components, but do not preclude the presence or addition of one or more other non-stated features, integers, operations, elements, components, and/or combinations thereof. As used herein, the term "and/or" includes any and all combinations of one or more of the associated listed items.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, the various embodiments of the present disclosure will be described in more detail with reference to the drawings.

FIG. 1 is a block diagram illustrating a data processing system including a memory system, according to an embodiment of the present disclosure.

Referring to FIG. 1, a data processing system 100 may include a host 102 and a memory system 110.

The host 102 may be or include, for example, a portable electronic device, such as a mobile phone, an MP3 player and a laptop computer. The host 102 may also be or include, for example, an electronic device, such as a desktop computer, a game player, a TV and a projector.

The memory system 110 may operate in response to a request from the host 102. For example, the memory system 110 may store data to be accessed by the host 102. The memory system 110 may be used as a main memory system of the host 102. The memory system may be used as an auxiliary memory system of the host 102.

The memory system 110 may be or include any one of various kinds of storage devices, according to the protocol of a host interface to be coupled electrically with the host 102. The memory system 110 may be or include any one of various kinds of storage devices, such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be or include a volatile memory device, such as a dynamic random access memory (DRAM), a static random access memory (SRAM) and the like. The storage devices for the memory system 110 may be or include a nonvolatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may Include a memory device 150 and a controller 130. The memory device may store data to be accessed by the host 102. The controller 130 may control the storage of data in the memory device 150.

The controller 130 and the memory device 150 may be integrated into a single semiconductor device. For instance, the controller 130 and the memory device 150 may be integrated into a single semiconductor device configured as a solid state drive (SSD). When the memory system 110 is configured as an SSD, the operation speed of the host 102 that is coupled electrically with the memory system 110 may be significantly increased.

The controller 130 and the memory device 150 may be integrated into a single semiconductor device configured as a memory card. The controller 130 and the memory card 150 may be integrated into a single semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

For another instance, the memory system 110 may be or Include a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102 during a write operation. The memory device 150 may provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) may be coupled electrically.

The memory device 150 may retain stored data when power supply to the device is interrupted or turned off. The memory device 150 may be a nonvolatile memory device, for example, a flash memory. The flash memory may have a three-dimensional (3D) stack structure. A 3D stack structure of a memory device 150 is described later in more detail with reference to FIGS. 2 to 11.

The controller 130 may control the memory device 150 in response to a request from the host 102. The controller 130 may control the flow of data between the memory device 150 and the host 102. For example, the controller 130 may provide data read from the memory device 150 to the host 102, and store data provided from the host 102 into the memory device 150. To this end, the controller 130 may control the overall operations of the memory device 150, such as, for example, read, write, program and erase operations.

In the example of FIG. 1, the controller 130 may include a host interface unit 132, a processor 134, an error correction code (ECC) unit 138, a power management unit 140, a NAND flash controller 142, and a memory 144.

The host interface unit 132 may process commands and data provided from the host 102. The host interface unit 132 may communicate with the host 102 through at least one of various interface protocols, such as universal serial bus (USB), multimedia card (MMC), peripheral component Interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and the like.

The ECC unit 138 may detect and correct errors in the data read from the memory device 150 during a read operation. For example, the ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include all circuits, systems or devices as may be needed for the error correction operation.

The PMU 140 may provide and or manage power for the controller 130, that is, power for the component elements included in the controller 130. Any suitable power module may be used.

The NFC 142 may serve as a memory interface between the controller 130 and the memory device 150 for allowing the controller 130 to control the memory device 150, for example, in response to a request from the host 102. The NFC 142 may generate control signals for the memory device 150 and process data under the control of the processor 134 when the memory device 150 is a flash memory and, for example, when the memory device 150 is a NAND flash memory. Although the interface unit 142 in the embodiment of FIG. 1 is an NFC unit suitable for interfacing the a NAND flash memory with the controller the invention is not limited in this way. The interface unit 142 may be any suitable interface unit suitable for interfacing the memory device 150 to the controller. It is noted that the specific architecture and functionality of the interface unit 142 may vary depending upon the type of the memory device employed.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be or include any suitable memory device. The memory 144 may be a volatile memory. The memory 144 may be or include a static random access memory (SRAM). The memory 144 may be or include a dynamic random access memory (DRAM). The memory 144 may include any suitable architecture. For example, the memory 144 may include a program memory, a data memory, a write buffer, a read buffer, a map buffer, and the like all of which are well known in the art.

The processor 134 may control general operations of the memory system 110. The processor 134 may control a write or a read operation for the memory device 150, in response to a write or a read request from the host 102. The processor 134 may be or comprise any suitable processor. The processor 134 may drive firmware, which is referred to as a flash translation layer (FTL), to control the general operations of the memory system 110. The processor 134 may be or Include a microprocessor. Any suitable microprocessor may be used. The processor 134 may be or include or a central processing unit (CPU).

A bad block management unit (not shown) may be included in the processor 134, for performing bad block management of the memory device 150. The bad block management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management operation, the data of the program-failed memory block or the bad memory block may be programmed into a new memory block. Bad blocks due to a program fall may seriously deteriorate the utilization efficiency of the memory device 150 and the reliability of the memory system 100. Thus, reliable bad block management may be included in the processor 134 for resolving these concerns.

Figure 2:
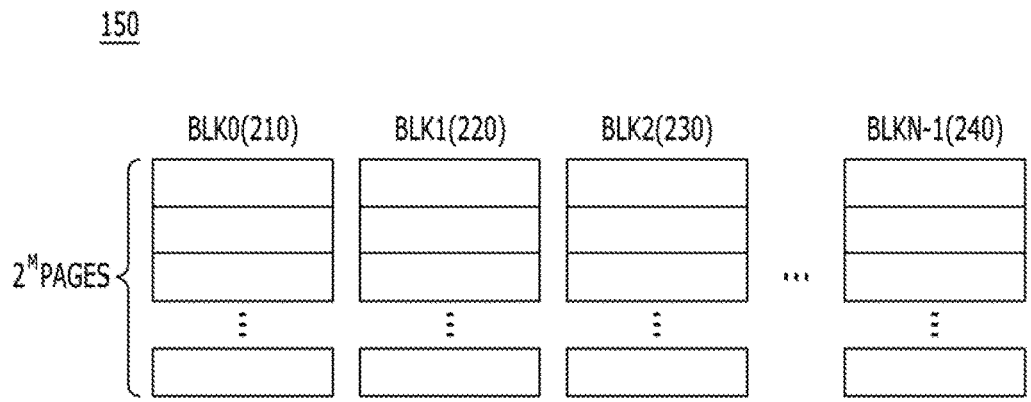
FIG. 2 is a diagram illustrating a memory device of the memory system shown in FIG. 1, the memory device including a plurality of memory bocks, according to an embodiment of the present invention.

FIG. 2 illustrates an example of a memory device 150 shown in FIG. 1.

Referring to FIG. 2, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines may be coupled electrically.

The memory blocks may be single level cell (SLC) memory blocks or multi-level cell (MLC) memory blocks, according to the number of bits which may be stored or expressed in each memory cell. An SLC memory block may include a plurality of pages including a plurality of memory cells, each memory cell being capable of storing 1-bit data. An MLC memory block may include a plurality of pages including a plurality of memory cells, each memory cell being capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
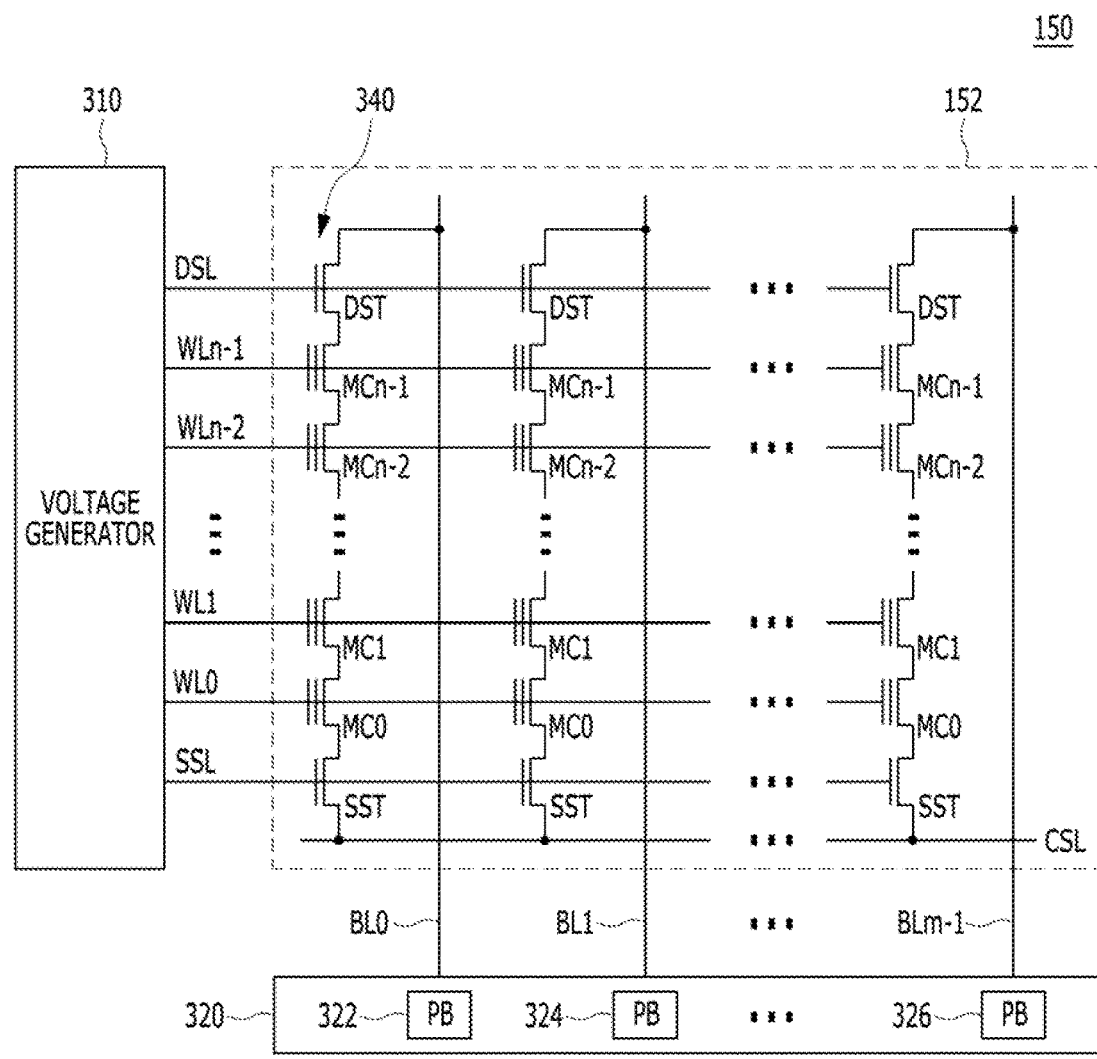
FIG. 3 is a circuit diagram illustrating a memory block of a memory device, according to an embodiment of the present invention.

FIG. 3 is a circuit diagram Illustrating one of the plurality of memory blocks 152 to 156 shown in FIG. 1.

Referring to FIG. 3, the memory block 152 of the memory device 150 may include a plurality of cell strings 340 which are coupled electrically to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be coupled electrically in series between the select transistors DST and SST. The respective memory cells MC0 to MCn−1 may be configured by multi-level cells (MLC) each of which stores data information of a plurality of bits. The strings 340 may be coupled electrically to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, the memory block 152 which is configured by NAND flash memory cells, it is to be noted that the memory block 152 of the memory device 150 according to with the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating the memory device 150 shown in FIG. 1.

Figure 4:
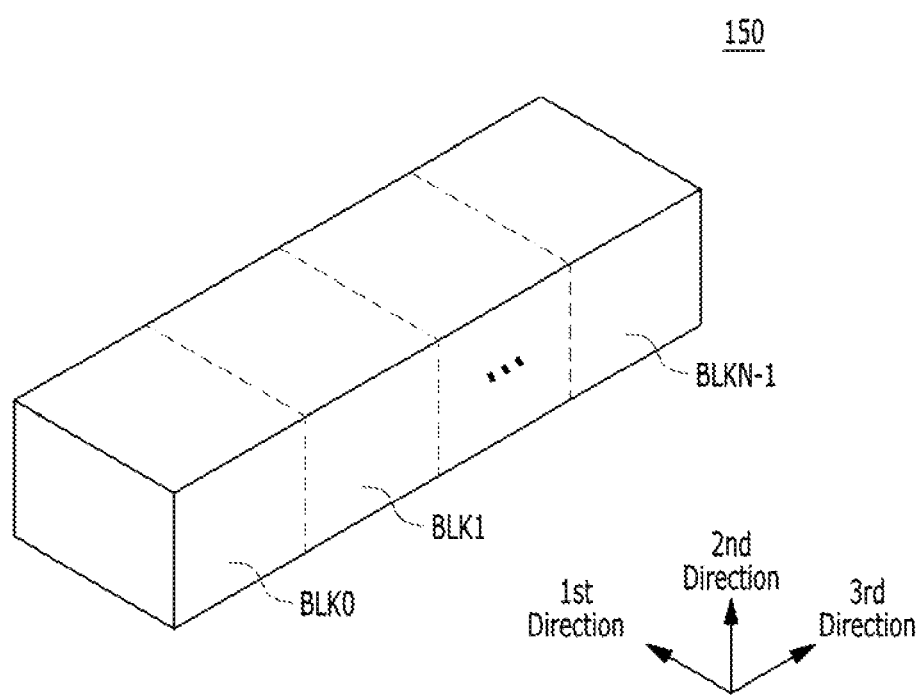
FIGS. 4 to 11 are diagrams schematically illustrating more structural details of the memory device of FIG. 2, according to embodiments of the present invention.

FIG. 4 is a block diagram Illustrating an example of the plurality of memory blocks 152 to 156 of the memory device 150 shown in FIG. 1.

Referring to FIG. 4, the memory device 150 may include a plurality of memory blocks BLK0 to BLKN-1. Each of the memory blocks BLK0 to BLKN-1 may be realized in a three-dimensional (3D) structure or a vertical structure. The respective memory blocks BLK0 to BLKN-1 may include structures extending in first to third directions, for example, an x-axis, a y-axis, and a z-axis direction.

The respective memory blocks BLK0 to BLKN-1 may include a plurality of NAND strings NS extending in the second direction. The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. Namely, the respective memory blocks BLK0 to BLKN-1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
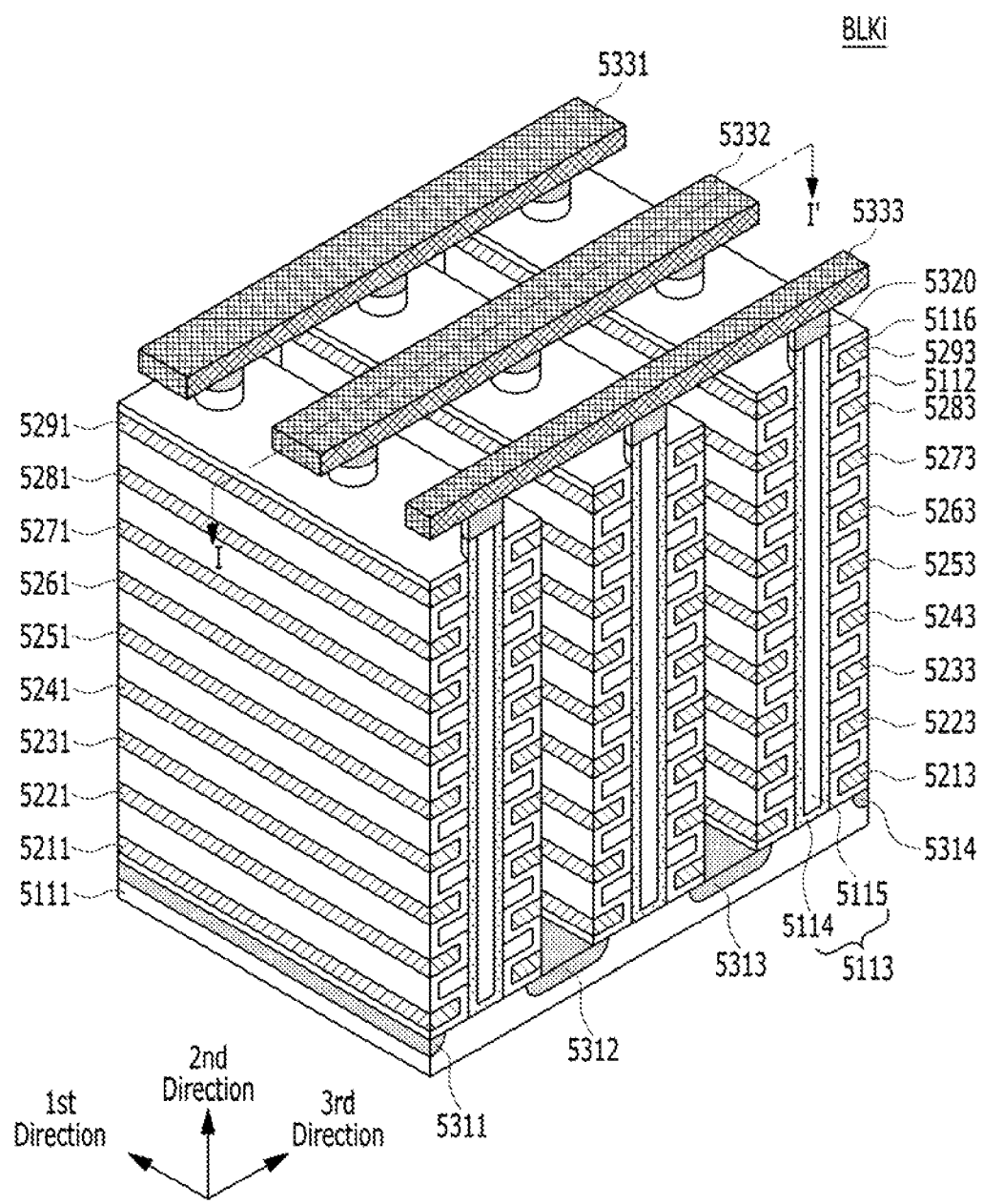
Figure 6:
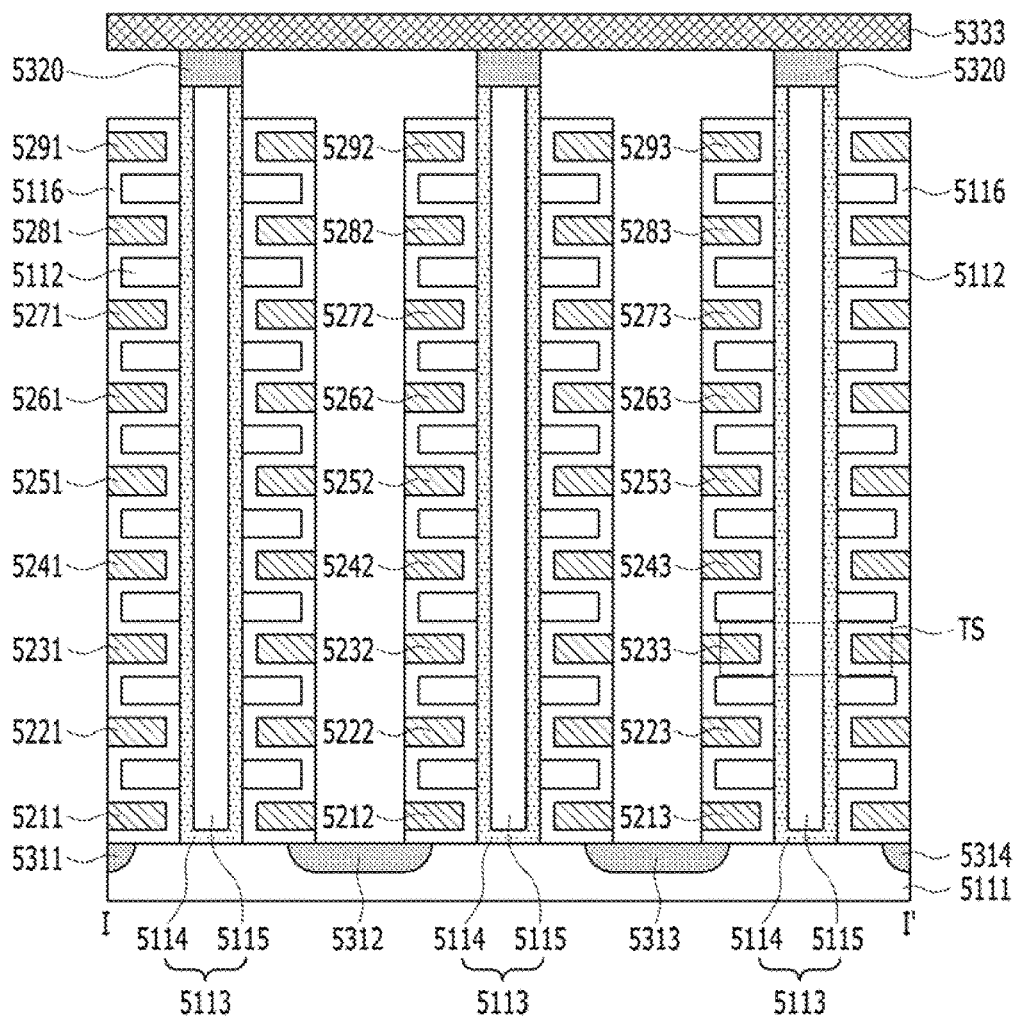

FIG. 5 is a perspective view of one BLKi of the plural memory blocks BLK0 to BLKN-1 shown in FIG. 4. FIG. 6 is a cross-sectional view taken along a line I-I' of the memory block BLKi shown in FIG. 5.

Referring to FIGS. 5 and 6, a memory block BLKi among the plurality of memory blocks of the memory device 150 may include a structure extending in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is p-type silicon, it is to be noted that the substrate 5111 is not limited to being p-type silicon.

A plurality of doping regions 5311 to 5314 extending in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 extending in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be coupled electrically with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 extending in the first direction may be provided between the dielectric material 5112 adjacent to the substrate 5111 and the substrate 5111. For example, the conductive material 5211 extending in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material extending in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 extending in the first direction may be provided between the dielectric materials 5112. The conductive material 5291 extending in the first direction may be provided over the uppermost dielectric material 5112. The conductive materials 5211 to 5291 extending in the first direction may be a metallic material. The conductive materials 5211 to 5291 extending in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 extending in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 extending in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 extending in the third direction may be provided over the drains 5320. The conductive materials 5331 to 5333 may be sequentially disposed in the first direction. The respective conductive materials 5331 to 5333 may be coupled electrically with the drains 5320 of corresponding regions. The drains 5320 and the conductive materials 5331 to 5333 extending in the third direction may be coupled electrically with through contact plugs. The conductive materials 5331 to 5333 extending in the third direction may be a metallic material. The conductive materials 5331 to 5333 extending in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 extending in the first direction. The respective pillars 5113 may form NAND strings NS together with the dielectric layer 5116 and the conductive materials 5211 to 5291, 5212 to 5292 and 5213 to 5293 extending in the first direction. Each NAND string NS may include a plurality of transistor structures TS.

Figure 7:
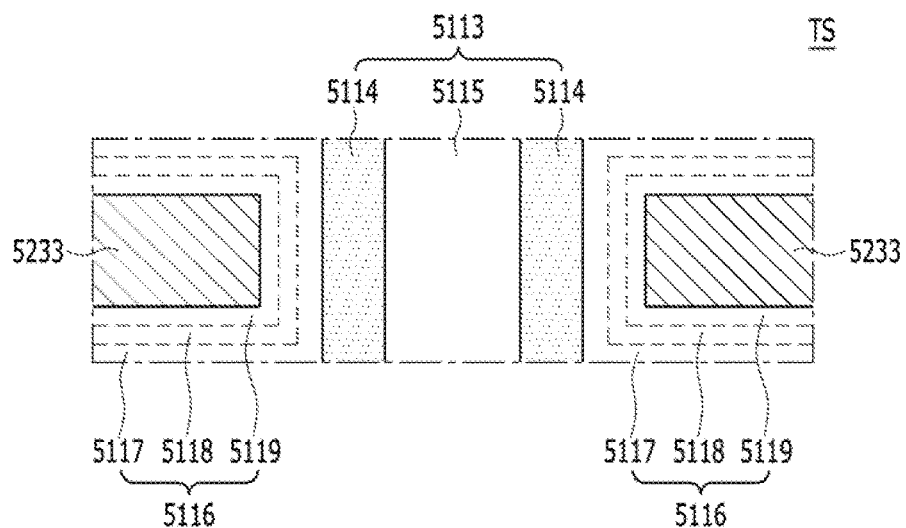

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer and may include a nitride layer or a metal oxide layer, such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer, such as an aluminum oxide layer, a hafnium oxide layer, or the like, having a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS extending in the second direction or a direction perpendicular to the substrate 5111.

Each NAND string NS may Include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 extending in the first direction. In other words, the gates or the control gates may extend in the first direction and form word lines and at least two select lines, at least one source select line SSL and at least one ground select line GSL.

The conductive materials 5331 to 5333 extending in the third direction may be coupled electrically to one end of the NAND strings NS. The conductive materials 5331 to 5333 extending in the third direction may serve as bit lines BL. That is, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

Namely, the memory block BLKi may include a plurality of NAND strings NS extending in a direction perpendicular to the substrate 5111, and may serve as a NAND flash memory block, for example, of a charge capturing type memory, in which a plurality of NAND strings NS are coupled electrically to one-bit line BL.

While it is illustrated in FIGS. 5 to 7 that the conductive materials 5211 to 5291, 5212 to 5292 and 5213 to 5293 extending in the first direction are provided in 9 layers, it is to be noted that the conductive materials 5211 to 5291, 5212 to 5292 and 5213 to 5293 extending in the first direction are not limited to being provided in 9 layers. For example, conductive materials extending in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are coupled electrically to one-bit line BL, it is to be noted that the embodiment is not limited to having 3 NAND strings NS that are coupled electrically to one-bit line BL. In the memory block BLKi, m number of NAND strings NS may be coupled electrically to one-bit line BL, m being a positive integer. According to the number of NAND strings NS which are coupled electrically to one-bit line BL, the number of conductive materials 5211 to 5291, 5212 to 5292 and 5213 to 5293 extending in the first direction and the number of common source lines 5311 to 5314 may be controlled as well.

Further, while it is illustrated in FIGS. 5 to 7 that 3 NAND strings NS are coupled electrically to one conductive material extending in the first direction, it is to be noted that the embodiment is not limited to having 3 NAND strings NS coupled electrically to one conductive material extending in the first direction. For example, n number of NAND strings NS may be coupled electrically to one conductive material extending in the first direction, n being a positive integer. According to the number of NAND strings NS which are coupled electrically to one conductive material extending in the first direction, the number of bit lines 5331 to 5333 may be controlled as well.

Figure 8:
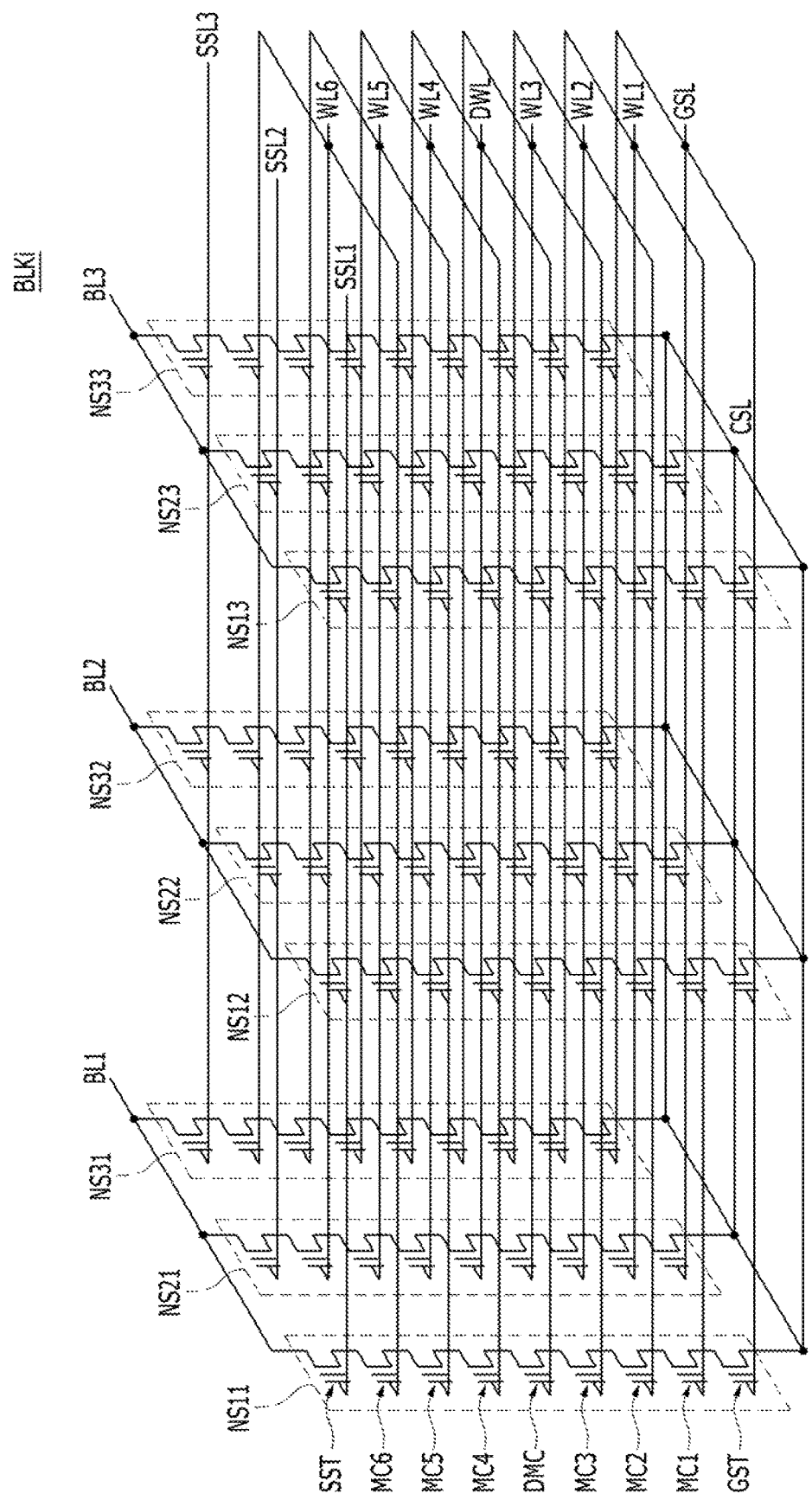

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, extending in the third direction. NAND strings NS12 to NS32 may be provided between a second bit line BL2 and the common source line CSL. The second bit line BL2 may correspond to the conductive material 5332 of FIGS. 5 and 6, extending in the third direction. NAND strings NS13 to NS33 may be provided between a third bit line BL3 and the common source line CSL. The third bit line BL3 may correspond to the conductive material 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC may be provided between the source select transistor SST and the ground select transistor GST of each NAND string NS.

In this example, NAND strings NS may be defined by units of rows and columns and NAND strings NS which are coupled electrically to one-bit line may form one column. The NAND strings NS11 to NS31 which are coupled electrically to the first bit line BL1 may correspond to a first column, the NAND strings NS12 to NS32 which are coupled electrically to the second bit line BL2 may correspond to a second column, and the NAND strings NS13 to NS33 which are coupled electrically to the third bit line BL3 may correspond to a third column. NAND strings NS which are coupled electrically to one source select line SSL may form one row. The NAND strings NS11 to NS13 which are coupled electrically to a first source select line SSL1 may form a first row, the NAND strings NS21 to NS23 which are coupled electrically to a second source select line SSL2 may form a second row, and the NAND strings NS31 to NS33 which are coupled electrically to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively coupled electrically to the different source select lines SSL1, SSL2 and SSL3.

The memory cells at the same height in the NAND strings NS in the same row may share a word line WL. That is, at the same height, the word lines WL coupled electrically to the memory cells MC of the NAND strings NS in different rows may be coupled electrically. Dummy memory cells DMC at the same height in the NAND strings NS of the same row may share a dummy word line DWL. Namely, at the same height or level, the dummy word lines DWL coupled electrically to the dummy memory cells DMC of the NAND strings NS in different rows may be coupled electrically.

The word lines WL or the dummy word lines DWL located at the same level or height or layer may be coupled electrically with one another at layers where the conductive materials 5211 to 5291, 5212 to 5292 and 5213 to 5293 extending in the first direction may be provided. The conductive materials 5211 to 5291, 5212 to 5292 and 5213 to 5293 extending in the first direction may be coupled electrically, in common, to upper layers through contacts. At the upper layers, the conductive materials 5211 to 5291, 5212 to 5292 and 5213 to 5293 extending in the first direction may be coupled electrically. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be coupled electrically to the ground select line GSL.

The common source line CSL may be coupled electrically to the NAND strings NS. Over the active regions and over the substrate 5111, the first to fourth doping regions 5311 to 5314 may be coupled electrically. The first to fourth doping regions 5311 to 5314 may be coupled electrically to an upper layer through contacts and, at the upper layer, the first to fourth doping regions 5311 to 5314 may be coupled electrically.

Namely, as shown in FIG. 8, the word lines WL of the same height or level may be coupled electrically. Accordingly, when a word line WL at a specific height is selected, all NAND strings NS which are coupled electrically to the word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system according to an embodiment implemented with a 3D nonvolatile memory device different from the first structure.

Figure 9:
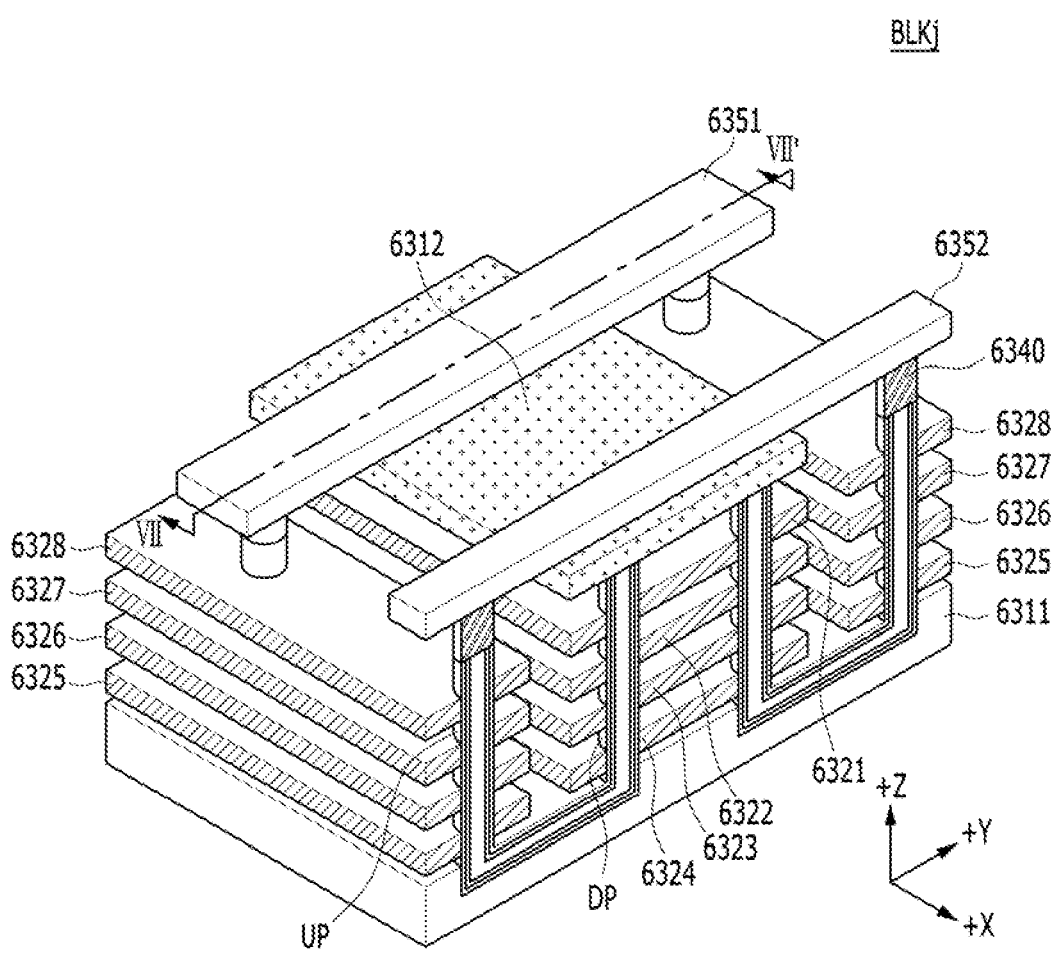

FIG. 9 is a perspective view schematically Illustrating the memory device implemented with the 3D nonvolatile memory device, which is different from the first structure described above with reference to FIGS. 5 to 8, and showing a memory block BLKj of the plurality of memory blocks of FIG. 4. FIG. 10 is a cross-sectional view of the memory block BLKj taken along the line VII-VII' of FIG. 9.

Figure 10:
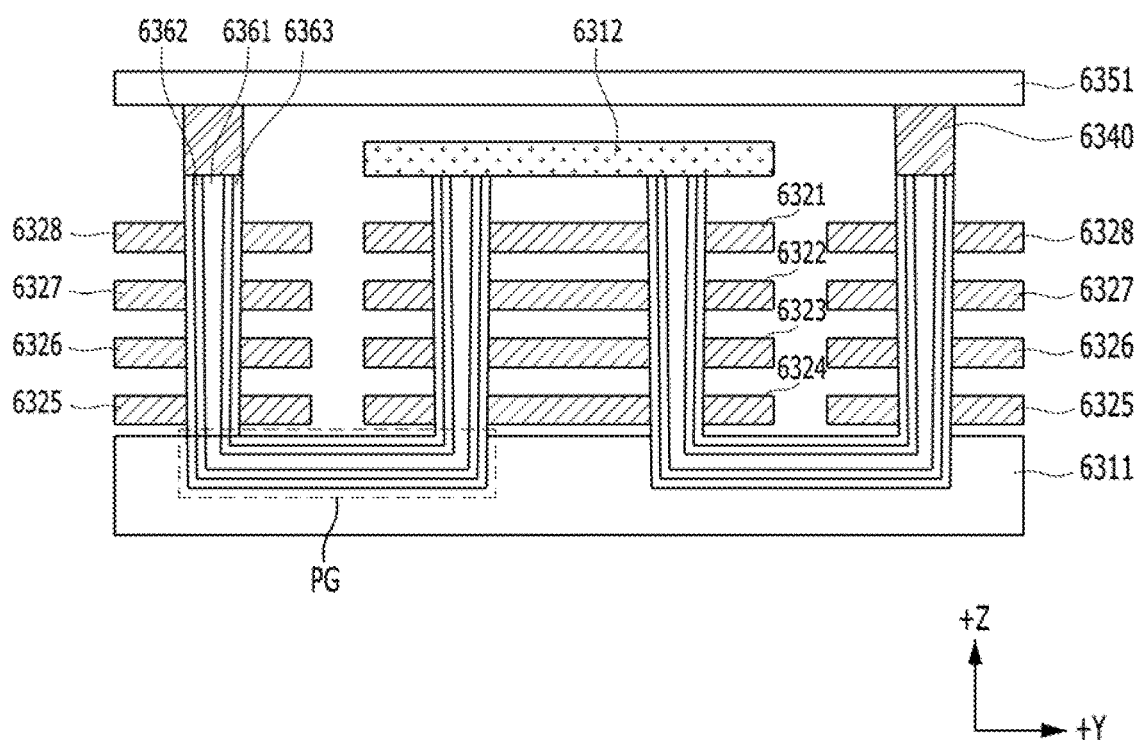

Referring to FIGS. 9 and 10, the memory block BLKj may include structures extending in the first to third directions.

A substrate 6311 may be provided. For example, the substrate 6311 may include a silicon material doped with a first type impurity.

For example, the substrate 6311 may include a silicon material doped with a p-type impurity or may be a p-type well, for example, a pocket p-well, and include an n-type well which surrounds the p-type well. While it is assumed in the described embodiment for the sake of convenience that the substrate 6311 is p-type silicon, it is to be noted that the substrate 6311 is not limited to being p-type silicon.

First to fourth conductive materials 6321 to 6324 extending in the x-axis direction and the y-axis direction may be provided over the substrate 6311. The first to fourth conductive materials 6321 to 6324 may be separated by a predetermined distance in the z-axis direction.

Fifth to eighth conductive materials 6325 to 6328 extending in the x-axis direction and the y-axis direction may be provided over the substrate 6311. The fifth to eighth conductive materials 6325 to 6328 may be separated by a predetermined distance in the z-axis direction. The fifth to eighth conductive materials 6325 to 6328 may be separated from the first to fourth conductive materials 6321 to 6324 in the y-axis direction.

A plurality of lower pillars DP may pass through the first to fourth conductive materials 6321 to 6324. Each lower pillar DP may extend in the z-axis direction. Also, a plurality of upper pillars UP may pass through the fifth to eighth conductive materials 6325 to 6328. Each upper pillar UP may extend in the z-axis direction.

Each of the lower and the upper pillars DP and UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically through a pipe gate PG. The pipe gate PG may be disposed in the substrate 6311. For instance, the pipe gate PG may include the same material as the material employed for the lower and upper pillars DP and UP.

A doping material 6312 of a second type extending in the x-axis and the y-axis directions may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 extending in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be coupled electrically through contact plugs. The first and second upper conductive materials 6351 and 6352 may serve as first and second bit lines BL1 and BL2, respectively.

The first conductive material 6321 may serve as a source select line SSL, the second conductive material 6322 may serve as a first dummy word line DWL1, and the third and fourth conductive materials 6323 and 6324 may serve as first and second main word lines MWL1 and MWL2, respectively. The fifth and sixth conductive materials 6325 and 6326 may serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP may form a lower string. The upper pillar UP and the fifth to eighth conductive materials 6325 to 6328 adjacent to the upper pillar UP may form an upper string. The lower string and the upper string may be coupled electrically through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string coupled electrically between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
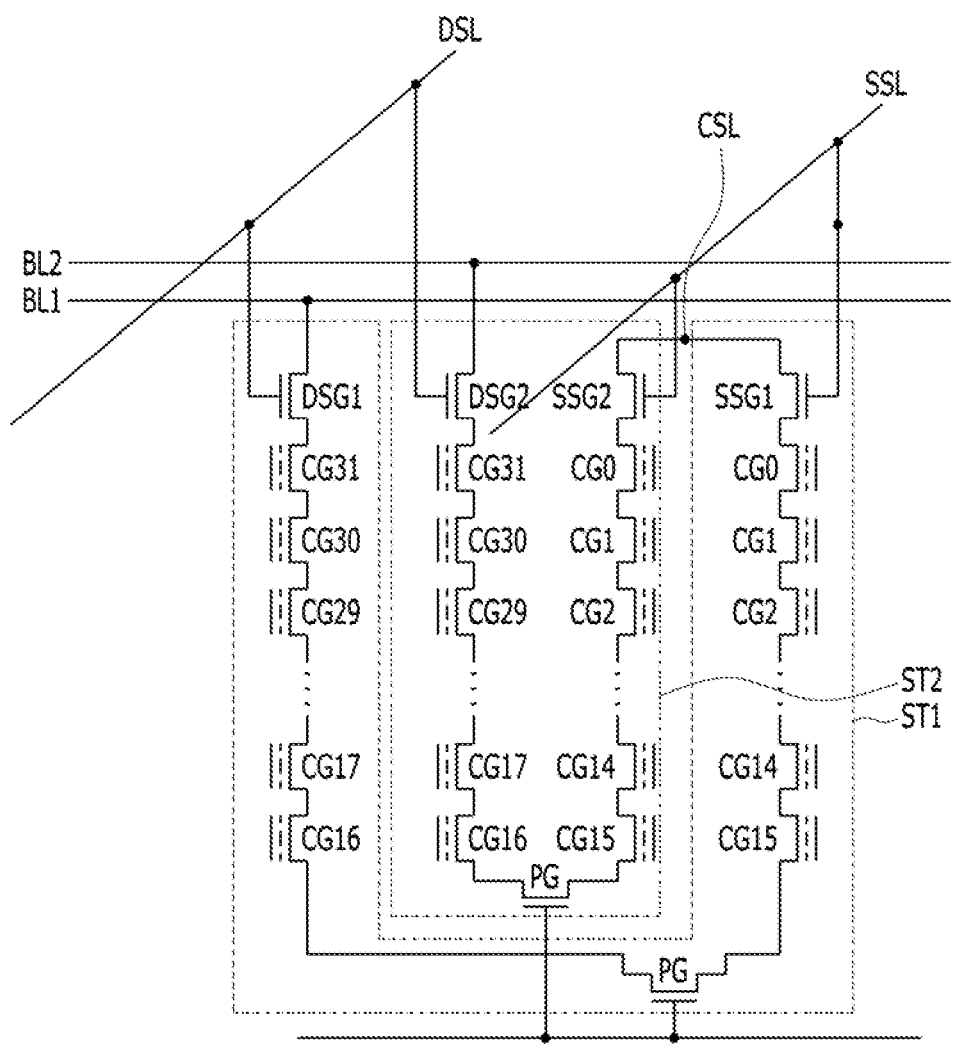

FIG. 11 is a circuit diagram illustrating the equivalent circuit of the memory block BLKj having the second structure as described above with reference to FIGS. 9 and 10. For the sake of convenience, only a first and a second string forming a pair in the memory block BLKj in the second structure are shown.

Referring to FIG. 11, in the memory block BLKj having the second structure among the plurality of blocks of the memory device 150, cell strings, each of which is implemented with one upper string and one lower string coupled electrically through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1, and the second string ST2 may be coupled electrically to a second bit line BL2.

While it is described in FIG. 11 that the first and second strings ST1 and ST2 may be coupled electrically to the same drain select line DSL and the same source select line SSL different layouts may be envisaged. For example, in an embodiment, the first and second strings ST1 and ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first and second strings ST1 and ST2 may be coupled electrically to the same drain select line DSL and the same bit line BL, the first string ST1 may be coupled electrically to a first source select line SSL1 and the second string ST2 may be coupled electrically a second source select line SSL2.

Hereinafter, described in more detail with reference to FIGS. 12 to 14 will be an operation of the memory system in response to a command received from the host 102. The operation may be, for example, a read/write operation for the memory device, according to an embodiment of the present invention.

Figure 12:
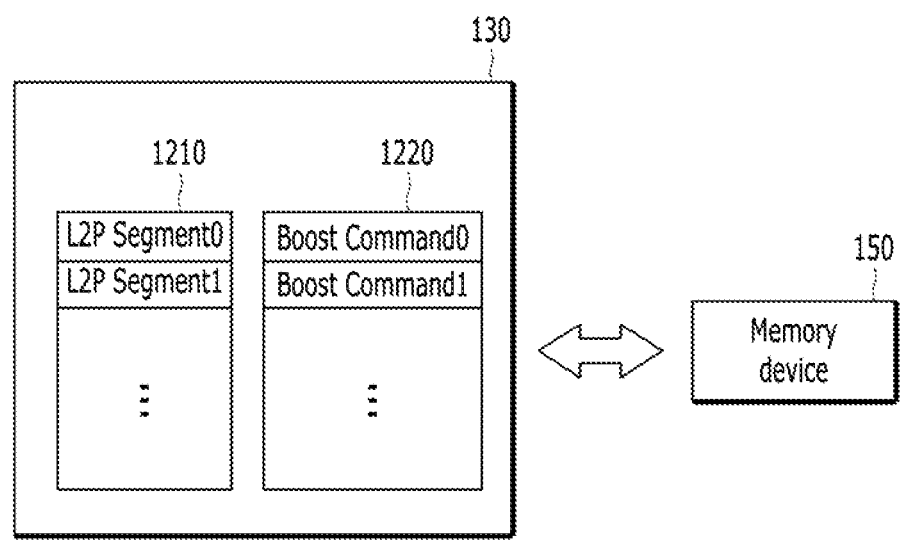
FIGS. 12 and 13 are diagrams schematically illustrating a data processing operation, according to an embodiment of the present invention.
Figure 13:
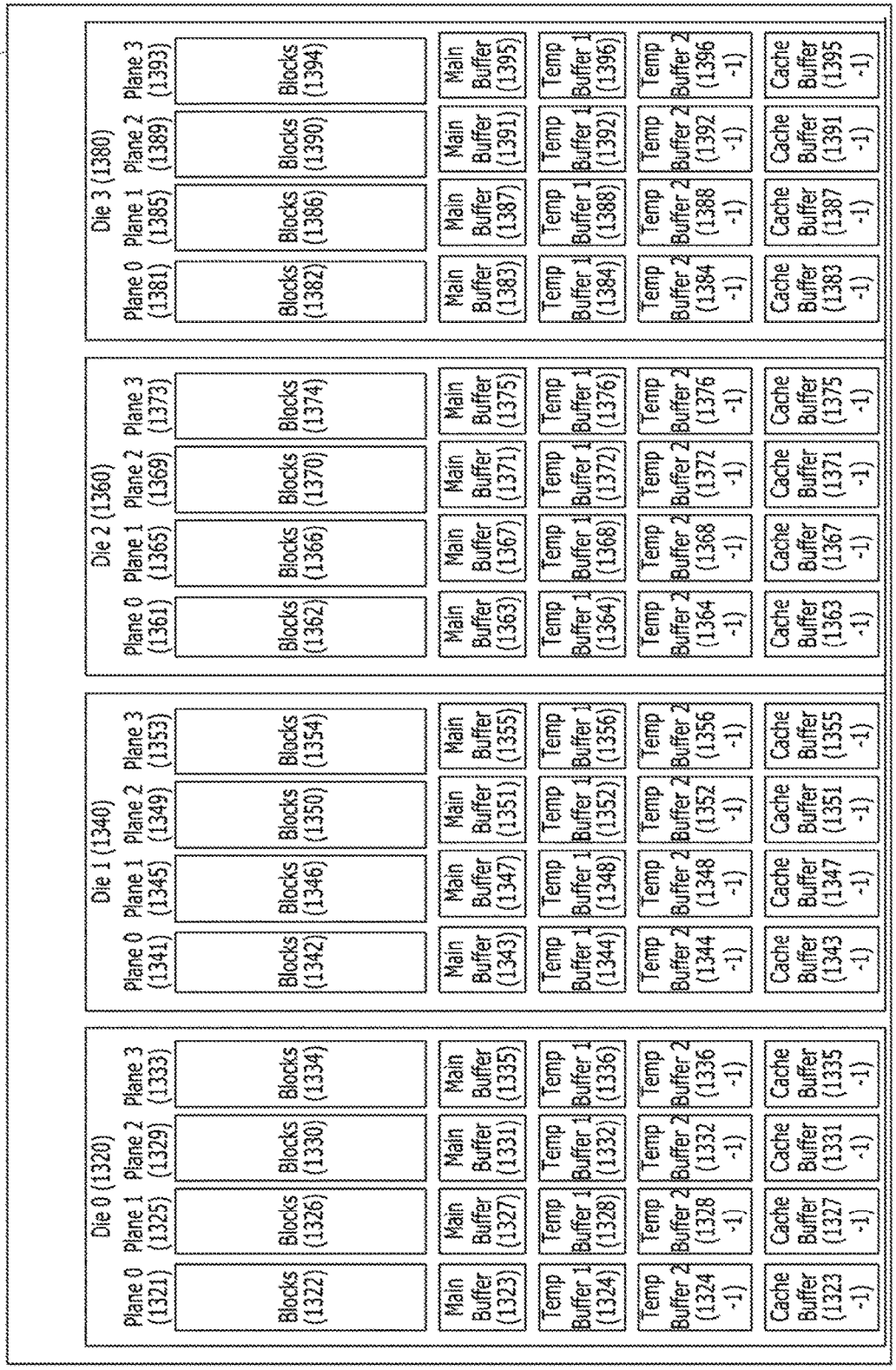

FIGS. 12 and 13 are diagrams schematically illustrating an example of a data processing operation for the memory device 150 in the memory system 110, according to an embodiment of the present invention.

In response to a read or write command provided from the host 102, command data (i.e., read data or write data) may be stored in the buffer/cache of the memory 144 of the controller 130. Then a command operation (i.e., the read or write operation) may be performed so that the data stored in the buffer/cache is provided to the host 102 in a read operation or programmed in a plurality of memory blocks included in the memory device 150 in a write operation (also referred to as a program operation).

According to an embodiment of the present invention, the buffer/cache of the memory device 150 may be dynamically segmented into two sub-buffer/sub-cache segments, a first sub-buffer/sub-cache segment for storing the command data and a second sub-buffer/sub-cache segment for storing the meta-data of the command data during the command operation.

Furthermore, hereinafter, a data processing operation of the memory system is illustrated as being performed by the controller 130, for convenience of description. It is noted, however, that, for example, the processor 134 of the controller 130 may also perform a data processing operation through the FTL as described above.

According to an embodiment of the present invention, the command data may be stored in the first sub-buffer/sub-cache segment of the buffer/cache included in the memory device 150 as well as in a buffer/cache included in the memory 144 of the controller 130.

The meta-data of the command data may be stored in the second sub-buffer/sub-cache segment of the buffer/cache of the memory device 150 as well as a map buffer/map cache of the buffer/cache included in the memory 144 during the command operation. The meta-data may be, for example, the map segments of the map data for the read data or write data in addition to the command data.

The size of the memory 144 of the controller 130 is limited, and therefore the size of the available memory 144 may be insufficient to store the meta-data of the command data. Accordingly, allowing the map segments of the map data for the read or write data (e.g., the meta-data of the command data) to be stored in a dynamically segmented and allocated sub-buffer/sub-cache of the memory device 150 in addition to the limitedly sized memory 144 of the controller 130 is advantageous.

According to an embodiment of the present invention, for example, the plurality of page buffers 322, 324, and 326, the plurality of caches, or the plurality of registers included in the memory device 300 of FIG. 3 may be segmented and allocated as the plurality of sub-buffers/sub-caches segments. The command data and the meta-data of the command data may be stored in the sub-buffers/sub-caches of the memory device 150 in addition to the limitedly sized memory 144 of the controller 130.

When the size of the buffer/cache included in the memory 144 of the controller 130 is smaller than the size of the command data and the meta-data of the command data (e.g. the map segments of the map data), the plurality of page buffers, caches, or registers included in the chips or dies of the memory device 150 may be dynamically segmented and allocated as map buffers/read buffers/write buffers (or map caches/read caches/write caches, or map registers/read registers/write registers) for the command operation in order to store the command data and the meta-data.

During the command operation in response to the command, the plurality of page buffers, caches, or registers included in the chips or dies of the memory device 150 may be segmented and allocated as the sub-buffer/sub-cache for storing the command data and the meta-data for the command data in addition to the buffer/cache included in the memory 144 of the controller 130. Accordingly, the command data and the meta-data of the command data can be stored in extended memory space provided by the sub-buffers/sub-caches of the memory device 150.

Referring to FIGS. 12 and 13, in response to a read command, the controller 130 may search a map cache 1210 included in the memory 144 of the controller 130 for the meta-data of a read data (for example, the map segments of the read data). In this case, when the map segments of the read data are not present in the map cache 1210, the controller 130 may send boost commands stored in a boost cache 1220, to the memory device 150 thereby searching the map segments of the read data stored in the page buffers or the memory blocks of the memory device 150. As a result of this searching, the controller 130 may identify a physical address corresponding to the logical address of the read data, read the read data from the memory block of the memory device 150 corresponding to the identified physical address, and provide the read data to the host 102. The boost cache may also be included in the memory 144 of the controller 130 as shown in FIG. 12.

Continuing with the same example, the controller 130 may search the meta-data (for example, the Logical to Physical (L2P) segments of L2P map data Including L2P map information as the map segments of the map data) of the read data in the map cache 1210 of the memory 144 of the controller 130. The controller 130 may maintain the L2P segments and a map list of the L2P segments, such as a Most Recently Used/Least Recently MRU/LRU list, in the map cache 1210. The controller 130 may transfer the L2P segments to the memory device 150 according to the MRU/LRU list.

In order to provide the read data from the memory device 150 to the host 102 in response to the read command, the controller 130 may identify the boost commands from a boost list stored in the boost cache 1220 for dies of the memory device 150 on which the read operation is to be performed. In particular, the controller 130 may first identify dies of the memory device 150 storing the read data and the boost commands from the boost list of the boost cache 1220, may then send the identified boost commands to the identified dies of the memory device 150 so that the memory device 150 may perform the read operation to the identified dies. The controller 130 may further receive the read data from the dies of the memory device 150, and provide the read data to the host 102.

During the read operation, the controller 130 may store and manage the read data and the meta-data of the read data in the map cache 1210 of the memory 144 of the controller 130. The meta-data of the read data may for example be the map segments of the map data for the read data.

Further, the controller 130 may dynamically segment the page buffers which correspond to the plurality of dies 0 to 3 (1320 to 1380) included in the memory device 150 into to sub-buffers, and may store and manage the read data, the meta-data (i.e., the map segments of the map data) of the read data and the map list of the map segments in the segmented sub-buffers of the memory device 150.

When the map segments of the map data for the read data are not present in the map cache 1210 of the controller 130, the controller 130 may search the map segments of the map data for the read data in the sub-buffers of the memory device 150 in order to perform the read operation. During the read operation, the controller 130 may store the read data in the sub-buffers of the memory device 150 while providing the read data to the host 102.

For example, in response to a read command, the controller 130 may segment the page buffers of the dies 0 to 3 (1320 to 1380) into the plurality of sub-buffers, read data from memory blocks of the dies 0 to 3 (1320 to 1380), and store the read data and the meta-data (i.e., the map segments of the map data) of the read data in the sub-buffers while providing the read data to the host 102.

The memory device 150, as described above, includes the plurality of dies 0 to 3 (1320 to 1380). Each of the dies 0 to 3 (1320 to 1380) includes a plurality of planes 0 to 3 (1321 to 1333, 1341 to 1353, 1361 to 1373, and 1381 to 1393).

Furthermore, each of the plurality of planes (1321 to 1333, 1341 to 1353, 1361 to 1373, and 1381 to 1393) include a plurality of respective memory blocks (1322 to 1334, 1342 to 1354, 1362 to 1374, and 1382 to 1394). For example, as described with reference to FIG. 2, each of the plurality of planes may include N memory blocks Block0, to Block N–1 including $2^M$ pages. Furthermore, the planes (1321 to 1333, 1341 to 1353, 1361 to 1373, and 1381 to 1393) may include respective page buffers. The page buffers of the respective planes include a plurality of sub-buffers, for example, main buffers 1323, 1327, 1331, and 1335; 1343, 1347, 1351, and 1355; 1363, 1367, 1371, and 1375; and 1383, 1387, 1391, and 1395, cache buffers 1323-1, 1327-1, 1331-1, and 1335-1; 1343-1, 1347-1, 1351-1, and 1355-1; 1363-1, 1367-1, 1371-1, and 1375-1; and 1383-1, 1387-1, 1391-1, and 1395-1, first temporary buffers 1324, 1328, 1332, and 1336; 1344, 1348, 1352, and 1356; 1364, 1368, 1372, and 1376; and 1384, 1388, 1392, and 1396, and second temporary buffers 1324-1, 1328-1, 1332-1, and 1336-1; 1344-1, 1348-1, 1352-1, and 1356-1; 1364-1, 1368-1, 1372-1, and 1376-1; and 1384-1, 1388-1, 1392-1, and 1396-1.

During the read operation, the read data from the memory blocks (1322 to 1334, 1342 to 1354, 1362 to 1374, and 1382 to 1394) is stored in the main buffers. The read data stored in the main buffers is transmitted to the cache buffers, and is then provided to the host 102 through the cache buffers.

The read data stored in the main buffers is copied to the second temp buffers. The meta-data of the read data stored in the main buffers is stored in the first temp buffers. In this case, a map list of the map segments of the map data stored in the first temp buffers may be managed in the map cache 1210 included in the memory 144 of the controller 130 or the first temp buffers.

During the read operation, the controller 130 may search the meta-data of data to be read in the memory 144 of the controller 130 through the map list stored in the map cache 1210. For example, the controller 130 in response to the read command may search the map segments of first data to be read based on the map list in the map cache 1210. When the map segments of the first data are found in the map cache 1210, the controller 130 may identify a physical address corresponding to the logical address of the first data through the map segments stored in the map cache 1210. The controller 130 may then identify the dies 0 to 3 (1320 to 1380) corresponding to the physical address of the first data based on the boost list stored in the boost cache 1220, and may send the boost commands to the dies 0 to 3 (1320 to 1380) corresponding to the Identified physical address. The controller 130 then may perform the read operation on the dies 0 to 3 (1320 to 1380).

For example, the controller 130 may identify the physical address corresponding to the logical address of the first data through the map segments of the first data stored in the map cache 1210. Then the controller 130 may identify the die corresponding to the physical address of the first data among the dies 0 to 3 (1320 to 1380) based on the boost list stored in the boost cache 1220. For example, the controller 130 may identify the die 0 (1320) corresponding to the physical address of the first data among the dies 0 to 3 (1320 to 1380) based on the boost list stored in the boost cache 1220. The controller 130 may then confirm whether the physical address of the first data corresponds to the memory blocks 1322 included in the plane 0 (1321) of the die 0 (1320) based on the map segments of the first data and may send boost commands that enable the read operation to be performed to the memory blocks 1322 included in the plane 0 (1321) of the die 0 (1320) based on the boost list stored in the boost cache 1220. Accordingly, the controller 130 may perform the read operation to the memory blocks 1322 included in the plane 0 (1321) of the die 0 (1320).

More specifically, the controller 130 may read the first data from the memory blocks 1322 by sending the boost commands to the plane 0 (1321) of the die 0 (1320) and may store the first read data in the main buffer 1323. Furthermore, the controller 130 may send the first read data from the main buffer 1323 to the cache buffer 1323-1, and also provide the host 102 with the first read data. Furthermore, the controller 130 may copy the first read data to the second temporary buffer 1324-1. Furthermore, the controller 130 stores the meta-data of the first data, for example, the map segments of the map data in the first temporary buffer 1324.

When another read command for the first data is provided from the host 102 or the controller 130 fails to provide the first data to the host 102, the controller 130 may identify the physical address corresponding to the logical address of the first data based on the map segments of the first data stored in the first temporary buffer 1324, may read the first data from the memory blocks 1322, and may provide the read first data to the host 102. Alternatively, the controller 130 may provide the host 102 with the first data copied in the second temporary buffer 1324-1 through the cache buffer 1323-1.

During the read operation, the controller 130 may search the meta-data of data to be read in the memory 144 of the controller 130 through the map list stored in the map cache 1210. For example, the controller 130 in response to the read command may search the map segments of second data to be read based on the map list in the map cache 1210. When the map segments of the second data are not found in the map cache 1210, the controller 130 may Identify the dies 0 to 3 (1320 to 1380) corresponding to the map segments of the second data based on the boost list stored in the boost cache 1220. The controller 130 may then send boost commands to the identified dies 0 to 3 (1320 to 1380) corresponding to the map segments of the second data, and may perform a read operation on the dies 0 to 3 (1320 to 1380).

For example, the controller 130 may search the memory blocks 1342 included in the plane 0 (1341) of the die 1 (1340) corresponding to the map segments of the second data among the dies 0 to 3 (1320 to 1380) based on the boost list stored in the boost cache 1220 because the map segments of the second data are not present in the map cache 1210. For example, the controller 130 may send boost commands that enable the read operation to be performed to the memory blocks 1342 included in the plane 0 (1341) of die 1 (1340) based on the boost list stored in the boost cache 1220. Accordingly, the controller 130 may search the map segments of the second data in the first temporary buffer 1344 corresponding to the plane 0 (1341) of die 1 (1340) based on the map list stored in the map cache 1210 or the first temporary buffer 1344. When the map segments of the second data are found in the first temporary buffer 1344, the controller 130 may send the map segments of the second data from the first temporary buffer 1344 to the cache buffer 1343-1 and may load the map segments of the second data onto the map cache 1210 included in the memory 144 of the controller 130.

Then, the controller 130 may identify a physical address corresponding to the logical address of the second data based on the map segments of the second data loaded onto the map cache 1210. The controller 130 may identify the memory blocks 1342 included in the plane 0 (1341) of die 1 (1340) corresponding to the physical address of the second data based on the boost list stored in the boost cache 1220, and send boost commands for enabling the read operation to be performed to the memory blocks 1342 included in the plane 0 (1341) of die 1 (1340) based on the boost list stored in the boost cache 1220. Accordingly, the controller 130 may perform the read operation to the memory blocks 1342 included in the plane 0 (1341) of die 1 (1340).

More specifically, the controller 130 may read the second data from the memory blocks 1342 by sending the boost commands to the plane 0 (1341) of die 1 (1340) and may store the read second data in the main buffer 1343. Furthermore, the controller 130 may send the second data from the main buffer 1343 to the cache buffer 1343-1, and provide the host 102 with the second data. Furthermore, the controller 130 may copy the second data to the second temporary buffer 1344-1 and store the meta-data of the second data, for example, the map segments of the map data, in the first temporary buffer 1344.

When another read command for the second data is provided from the host 102 or the controller 130 fails to provide the second data to the host 102, the controller 130 may identify the physical address corresponding to the logical address of the second data based on the map segments of the second data stored in the first temporary buffer 1344, may read the second data from the memory blocks 1342, and may provide the read second data to the host 102. Alternatively, the controller 130 may provide the host 102 with the second data copied in the second temporary buffer 1344-1 through the cache buffer 1343-1.

During the read operation, the controller 130 may search the meta-data of data to be read in the memory 144 of the controller 130 through the map list stored in the map cache 1210. For example, the controller 130 in response to the read command may search the map segments of third data to be read based on the map list in the map cache 1210. When the map segments of the third data are not found in the map cache 1210, the controller 130 may identify the dies 0 to 3 (1320 to 1380) corresponding to the map segments of the third data based on the boost list stored in the boost cache 1220, send boost commands to the dies 0 to 3 (1320 to 1380) corresponding to the map segments of the third data, and perform a read operation on the dies 0 to 3 (1320 to 1380).

For example, the controller 130 may search the memory blocks 1362 included in the plane 0 (1361) of the die 2 (1360) corresponding to the map segments of the third data among the dies 0 to 3 (1320 to 1380) based on the boost list stored in the boost cache 1220 because the map segments of the third data are not present in the map cache 1210. For example, the controller 130 may send boost commands that enable the read operation to be performed to the memory blocks 1362 included in the plane 0 (1361) of die 2 (1360) based on the boost list stored in the boost cache 1220. Accordingly, the controller 130 may search the map segments of the third data in the first temporary buffer 1364 corresponding to the plane 0 (1361) of die 2 (1360) based on the map list stored in the map cache 1210 or the first temporary buffer 1364. When the map segments of the third data are not found in the first temporary buffer 1364, the controller 130 may read the map segments of the third data from a map block among the memory blocks 1362 of the plane 0 (1361) of die 2 (1360) and store the read map segments of the third data into the main buffer 1363. The controller 130 may then send the map segments of the third data from the main buffer 1363 to the cache buffer 1363-1 and load the map segments of the third data onto the map cache 1210 included in the memory 144 of the controller 130.

Then, the controller 130 may Identify a physical address corresponding to the logical address of the third data based on the map segments of the third data loaded onto the map cache 1210. The controller 130 may identify the memory blocks 1362 included in the plane 0 (1361) of die 2 (1360) corresponding to the physical address of the third data based on the boost list stored in the boost cache 1220, and send boost commands for enabling the read operation to be performed to the memory blocks 1362 included in the plane 0 (1361) of die 2 (1360) based on the boost list stored in the boost cache 1220. Accordingly, the controller 130 may perform the read operation to the memory blocks 1362 included in the plane 0 (1361) of die 2 (1360).

More specifically, the controller 130 may read the third data from the memory blocks 1362 by sending the boost commands to the plane 0 (1361) of die 2 (1360) and store the read third data in the main buffer 1363. Furthermore, the controller 130 may send the third data from the main buffer 1363 to the cache buffer 1363-1, and provide the host 102 with the third data. Furthermore, the controller 130 may copy the third data to the second temporary buffer 1364-1. Furthermore, the controller 130 may store the meta-data of the third data, for example, the map segments of the map data in the first temporary buffer 1364.

When another read command for the third data is provided from the host 102 or the controller 130 falls to provide the third data to the host 102, the controller 130 may identify the physical address corresponding to the logical address of the third data based on the map segments of the third data stored in the first temporary buffer 1364, may read the third data from the memory blocks 1362, and may provide the read third data to the host 102. Alternatively, the controller 130 may provide the host 102 with the third data copied in the second temporary buffer 1364-1 through the cache buffer 1363-1.

As described above, in an embodiment of the present invention, each of a plurality of page buffers, caches, registers, or latches included in the plurality of dies of the memory device 150 may be dynamically segmented into a plurality of sub segments, such as for example sub-buffers/sub-caches. The meta-data of command data corresponding to a command, for example, the map segments of the map data may be stored in the sub-buffers/sub-caches of the memory device 150 in addition to the memory 144 of the controller 130. When a command operation corresponding to the command is to be performed, the meta-data of the command data may be searched in the memory 144 of the controller 130 or the sub-buffers/sub-caches of the memory device 150. For example, the map segments of the command data are found in the memory 144 of the controller 130 or the sub-buffers/sub-caches of the memory device 150. The map segments of the command data found in the sub-buffers/sub-caches of the memory device 150 may be loaded onto the memory 144 of the controller 130. Accordingly, an operation for searching the memory blocks of the memory device 150 for the meta-data can be minimized. Accordingly, a command operation can be performed more rapidly and stably by rapidly confirming the meta-data of the command data.

Figure 14:
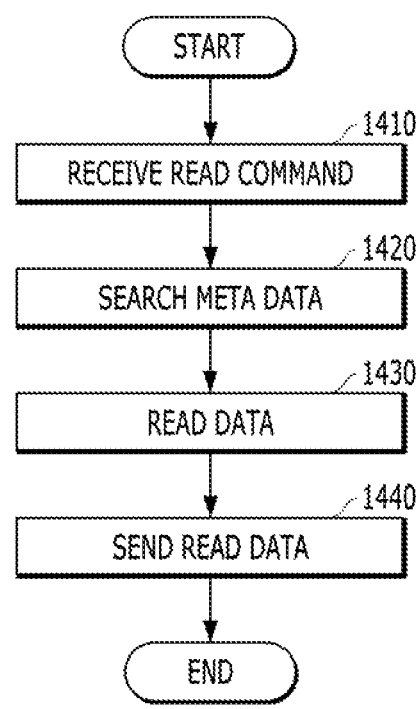
FIG. 14 is a flowchart of a data processing operation, according to an embodiment of the present invention.

FIG. 14 is a flowchart of an operation for processing data in the memory system 110 according to an embodiment of the present disclosure.

Referring to FIGS. 12 to 14, the memory system 110 may receive a command, for example, a read command from the host at step 1410. The controller may then search the meta-data of the data to be read at step 1420. The meta-data of the data to be read may be, for example, the map segments of the map data. The meta-data of the data to be read may be stored in the memory 144 of the controller 130 or the sub-buffer of the page buffers of the dies of the memory device 150, as described above. At step 1420, the memory system 110 may find the map segments of the read data in the memory 144 of the controller 130 or the sub-buffer of the memory device 150. When the map segments of the read data are found in the sub-buffer of the memory device 150, the memory system 110 may load the map segments of the read data onto the memory 144 of the controller 130.

At step 1430, the memory system 110 may identify a physical address corresponding to the logical address of the read data based on the map segments of the read data and may read data from memory blocks of the memory device 150 corresponding to the physical address.

At step 1440, the memory system 110 may send the data read from the memory blocks of the memory device 150 to the host 102. That is, the memory system 110 may provide the read data to the host 102.

As an example, an operation for searching the map segments of the map data of the data to be read in response to the read command, storing the map segments and the map list in the memory 144 of the controller 130 or the sub-buffer of the memory device 150, and performing the read operation has been described in detail with reference to FIGS. 12 and 13. Accordingly, a detailed description of the operation is omitted.

The memory system and the operating method of the memory system according to the aforementioned embodiments of the present invention can process data more rapidly and stably by minimizing the complexity of the memory device and reducing the performance load of the memory device. Hence, the overall use efficiency of the memory device may also be improved.

Although various embodiments have been described for illustrative purposes, it will be apparent to those skilled in the art that various changes and modifications may be made without departing from the spirit and/or scope of the invention as defined in the following claims.

What is claimed is:
1. A memory system, comprising:
a memory device including a plurality of planes each including a plurality of memory blocks suitable for storing data, and a plurality of page buffers corresponding to the planes; and
a controller including a memory, the controller being suitable for performing a read operation to the memory blocks of a first plane storing a first data corresponding to a read command among the planes by referring to a meta-data of the first data, and for providing the first data to a host;
wherein the meta-data is configured to be stored in the memory, the page buffers, or the memory blocks of the memory device, wherein the controller reads the first data from the memory blocks of the first plane, and provides the first data to a host through a first page buffer corresponding to the first plane among the page buffers in the memory device, wherein when the meta-data is not found in the memory, the controller provides the first plane with a first boost command corresponding to the first plane among boost commands stored in the memory, wherein in response to the first boost command, the controller controls the memory device to read the first data in the memory blocks by identifying a physical address corresponding to a logical address of the first data according to the meta data stored in the memory blocks when the meta-data is not found in the page buffers, wherein the controller dynamically segments the page buffers into sub-buffers including a first sub-buffer, a second sub-buffer, a third sub-buffer and a fourth sub-buffer in response to the read command, wherein the controller stores the read first data in the first sub-buffer, provides the read first data to the host through the second sub-buffer, stores the meta-data of the read first data in the third sub-buffer and stores a copy of the read first data in the fourth sub-buffer, and wherein the controller reads the first data stored in the memory blocks by loading the meta-data stored in the third sub-buffer to the memory when another read command for the first data is provided from the host or the controller fails to provide the first data to the host.

2. The memory system of claim 1, wherein when the meta-data is not found in the memory, the controller searches the meta-data in the third sub-buffer, and loads the meta-data stored in the third sub-buffer onto the memory.

3. The memory system of claim 1, wherein when the meta-data is not found in both of the memory and the first page buffer, the controller stores the meta-data stored in the memory blocks of the first plane in the first sub-buffer, and loads the meta-data stored in the first sub-buffer onto the memory.

4. The memory system of claim 1, wherein when the controller fails to provide the host with the first data or another read command for the first data is provided, the controller provides the host with the copy of the first data stored in the fourth sub-buffer.

5. The memory system of claim 1,
wherein the meta-data comprises map segments of map data of the first data, and the controller searches the meta-data in one of the memory and the page buffers based on a map list of the map segments stored in one of the memory and the page buffers.

6. The memory system of claim 1,
wherein the controller:
loads the meta-data stored in a first page buffer corresponding to the first plane among the page buffers onto the memory according to the first boost command; and
provides the host with the first data stored in the memory blocks of the first plane through the first page buffer, and stores the first data and the meta-data in the first page buffer during the read operation.

7. An operating method of a memory system including a memory device and a controller, comprising:
receiving, by the memory device, a read command for a first data stored in a first plane among a plurality of planes each including a plurality of memory blocks in the memory device;

performing, by the controller, a read operation to the memory blocks of the first plane storing the first data by referring to a meta-data of the first data; and providing, by the controller, the first data to a host,
wherein the meta-data is configured to be stored in a memory of the controller, a plurality of page buffers of the memory device respectively corresponding to the planes, or the memory blocks of the memory device, wherein the performing of the read operation comprises:
reading, by the controller, the first data from the memory blocks of the first plane; and
providing, by the controller, the first data to the host through a first page buffer corresponding to the first plane among the page buffers in the memory device,
providing, by the controller, the first plane with a first boost command corresponding to the first plane among boost commands stored in the memory when the meta-data is not found in the memory,
controlling, by the controller, the memory device to read the first data in the memory blocks in response to the first boost command by identifying a physical address corresponding to a logical address of the first data according to the meta data stored in the memory blocks when the meta-data is not found in the page buffers;
dynamically segmenting, by the controller, the page buffers into sub-buffers including a first sub-buffer, a second sub-buffer, a third sub-buffer and a fourth sub-buffer in response to the read command;
storing, by the controller, the read first data in the first sub-buffer;
providing, by the controller, the read first data to the host through the second sub-buffer;
storing, by the controller, the meta-data of the read first data in the third sub-buffer;
storing, by the controller, a copy of the read first data in the fourth sub-buffer; and
reading, by the controller, the first data stored in the memory blocks by loading the meta-data stored in the third sub-buffer to the memory when another read command for the first data is provided from the host or the controller fails to provide the first data to the host.

8. The operating method of claim 7, wherein when the meta-data is not found in the memory, the performing of the read operation comprises:
searching the meta-data in the third sub-buffer; and
loading the meta-data stored in the third sub-buffer onto the memory.

9. The operating method of claim 7, wherein when the meta-data is not found in both of the memory and the first page buffer, the performing of the read operation comprises:
storing the meta-data stored in the memory blocks of the first plane in the first sub-buffer; and
loading the meta-data stored in the first sub-buffer onto the memory.

10. The operating method of claim 7, when the providing of the first data fails or another read command for the first data is provided, further comprising providing the host with the copy of the first data stored in the fourth sub-buffer.

11. The operating method of claim 7,
wherein the meta-data comprises map segments of map data of the first data; and
wherein the referring to the meta-data of the first data comprises searches the meta-data in one of the memory and the page buffers based on a map list of the map segments stored in one of the memory and the page buffers.

12. The operating method of claim 7,
wherein the performing of the read operation further comprises:
loading the meta-data stored in a first page buffer corresponding to the first plane among the page buffers onto the memory according to the first boost command; and
storing the first data and the meta-data in the first page buffer, and
wherein the providing of the first data is performed with the first data stored in the memory blocks of the first plane through the first page buffer.

* * * * *